United States Patent
Boutin et al.

(10) Patent No.: US 12,488,269 B2
(45) Date of Patent: Dec. 2, 2025

(54) QUANTUM-CAPACITANCE SIMULATION USING GAUSSIAN-SUBSPACE AGGREGATION

(71) Applicant: Microsoft Technology Licensing, LLC, Redmond, WA (US)

(72) Inventors: Samuel Boutin, Goleta, CA (US); Roman Bela Bauer, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 18/053,072

(22) Filed: Nov. 7, 2022

(65) Prior Publication Data
US 2024/0037434 A1 Feb. 1, 2024

Related U.S. Application Data

(60) Provisional application No. 63/370,096, filed on Aug. 1, 2022.

(51) Int. Cl.
G06N 10/20 (2022.01)
G06N 10/60 (2022.01)

(52) U.S. Cl.
CPC ............ *G06N 10/20* (2022.01); *G06N 10/60* (2022.01)

(58) Field of Classification Search
CPC ............................. G06N 10/20; G06N 10/60
See application file for complete search history.

(56) References Cited

U.S. PATENT DOCUMENTS 11,620,561 B2 * 4/2023 Novotny ............... G06N 10/20 706/62
11,989,623 B2 * 5/2024 Tomaru ................. G06N 10/20
(Continued)

OTHER PUBLICATIONS

International Search Report and Written Opinion received for PCT Application No. PCT/US2023/025696, Jun. 7, 2024, 17 pages.
(Continued)

*Primary Examiner* — David E Choi
(74) *Attorney, Agent, or Firm* — Alleman Hall & Tuttle LLP

(57) ABSTRACT

A method for simulating a quantum-capacitance response of a material configuration comprises (a) constructing a non-interacting Hamiltonian for the material configuration based on input data; (b) computing a natural-orbitals basis for each of a plurality of parts of the material configuration under the non-interacting Hamiltonian; (c) projecting the non-interacting Hamiltonian in the natural-orbitals basis to obtain a non-interacting quantum-mechanical description for each part; (d) constructing an interacting Hamiltonian by adding an electron-interaction term to the non-interacting Hamiltonian for each of the plurality of parts; (e) for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian; (f) for each of a plurality of vicinities of representative points in the sample space, combining bases of Gaussian states assembled for nearby representative points to form an extended basis; and (g) forecasting the quantum-capacitance response within the sample space using the extended basis.

20 Claims, 9 Drawing Sheets

(56) References Cited

U.S. PATENT DOCUMENTS

| | | | | |
|---|---|---|---|---|
| 2004/0238813 | A1* | 12/2004 | Lidar | G06N 10/20 257/31 |
| 2017/0199036 | A1* | 7/2017 | Moxley, III | G01R 33/0354 |
| 2019/0251466 | A1* | 8/2019 | Mezzacapo | G06N 10/60 |
| 2020/0057957 | A1* | 2/2020 | Johnson | G02F 1/01791 |
| 2020/0184023 | A1* | 6/2020 | Delaney | G06F 30/327 |
| 2020/0293937 | A1* | 9/2020 | Babbush | G06N 10/40 |
| 2021/0035009 | A1* | 2/2021 | Babbush | G06F 30/20 |
| 2021/0374590 | A1* | 12/2021 | Biamonte | G06N 10/20 |
| 2021/0398009 | A1* | 12/2021 | Vuletic | G21K 1/06 |
| 2022/0254453 | A1* | 8/2022 | Babbush | G06N 10/20 |
| 2023/0020166 | A1* | 1/2023 | Elfving | G16C 20/30 |
| 2023/0142209 | A1 | 5/2023 | Bauer et al. | |
| 2023/0185875 | A1* | 6/2023 | Niroula | G06F 17/16 708/441 |
| 2024/0037434 | A1* | 2/2024 | Boutin | G06N 3/0464 |

OTHER PUBLICATIONS

Schuch, et al., "Matrix product state algorithms for Gaussian fermionic states", Physical Review B, vol. 100, Issue. 24, Dec. 15, 2019, pp. 1-20.

Zheng, et al., "From Real Materials to Model Hamiltonians With Density Matrix Downfolding", Frontiers in Physics, vol. 6, May 11, 2018, pp. 1-16.

Karzig, et al., "Scalable Designs for Quasiparticle-Poisoning-Protected Topological Quantum Computation with Majorana Zero Modes", In Journal of Physical Review B, vol. 95, Issue 23, Jun. 21, 2017, 32 Pages.

Souto, et al., "Transient Dynamics of a Magnetic Impurity Coupled to Superconducting Electrodes: Exact Numerics Versus Perturbation Theory", In Repository of arXiv:2108.05959v1, Aug. 12, 2021, 12 Pages.

White, Steven R., "Density Matrix Formulation for Quantum Renormalization Groups", In Journal of Physical Review Letters, vol. 69, Issue 19, Nov. 9, 1992, pp. 2863-2866.

Woods, et al., "Effective Theory Approach To The Schrodinger-Poisson Problem In Semiconductor Majorana Devices", In Journal of Physical Review B, vol. 98, Issue 3, Jul. 24, 2018, 28 Pages.

Boutin, et al., "Quantum Impurity Models using Superpositions of Fermionic Gaussian States: Practical Methods and Applications", In Journal of Physical Review Research, vol. 3, Issue 3, Aug. 24, 2021, 15 Pages.

\* cited by examiner

QUANTUM-CAPACITANCE SIMULATION USING GAUSSIAN-SUBSPACE AGGREGATION

CROSS REFERENCE TO RELATED APPLICATION

This application claims priority to U.S. Provisional Patent Application Ser. No. 63/370,096 filed 1 Aug. 2022, the entirety of which is hereby incorporated herein by reference for all purposes.

BACKGROUND

A quantum computer is a physical machine configured to execute logical operations based on quantum-mechanical phenomena. Such logical operations may include, for example, mathematical computation. Current interest in quantum-computer technology is motivated by analysis suggesting that the computational efficiency of an appropriately configured quantum computer may surpass that of any practicable nonquantum computer when applied to certain types of problems. Such problems include computer modeling of natural and synthetic quantum systems, integer factorization, data searching, and function optimization as applied to systems of linear equations and machine learning.

SUMMARY

One aspect of this disclosure relates to a method for simulating a quantum-capacitance response of a material configuration. The method comprises (a) constructing a non-interacting Hamiltonian for the material configuration based on input data; (b) computing a natural-orbitals basis for each of a plurality of parts of the material configuration under the non-interacting Hamiltonian; (c) projecting the non-interacting Hamiltonian in the natural-orbitals basis to obtain a non-interacting quantum-mechanical description for each of the plurality of parts; (d) constructing an interacting Hamiltonian by adding an electron-interaction term to the non-interacting Hamiltonian for each of the plurality of parts; (e) for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian; (f) for each of a plurality of vicinities of representative points in the sample space of at least one tunable parameter, combining bases of Gaussian states assembled for nearby representative points to form an extended basis; and (g) forecasting the quantum-capacitance response within the sample space of the at least one tunable parameter using the extended basis.

Another aspect of this disclosure relates to a quantum computer comprising a qubit register with a plurality of physical qubits each including a material configuration; and an interface configured to measure a quantum capacitance of the material configuration to thereby reveal a quantum state held in the qubit register. In some examples, the quantum capacitance is measured by subjecting the material configuration to external stimuli determined pursuant to the simulation methods herein. In some examples, fabrication of the material configuration, including material selection and geometry, is informed and/or optimized by the simulation methods herein.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

1. Overview

As described in further detail herein, a qubit register of a quantum computer may comprise a series of physical qubits in the form of replicated material configurations. In some quantum computers, the physical qubits may include exotic materials—semiconductors, metals, and/or superconductors of predetermined dimensions, arranged in a predetermined configuration. Generally speaking, the quantum-mechanical description of a material configuration subject to certain external conditions ('tuning parameters' herein) determines whether or not that configuration is suitable for use as a qubit. For configurations that may be suitable, the quantum-mechanical description determines the additional external stimuli (e.g., signals or pulses) that should be applied to the qubit for desired operation. Example tuning parameters and stimuli may include gate voltage, external magnetic field, and the like, where one particular combination of stimuli may effect a quantum-gate operation on the quantum state held within the qubits, and another combination of stimuli may effect a measurement of the quantum state. In every case the details of the appropriate tuning parameters and stimuli are functions of the quantum-mechanical description of the material configuration. In that spirit, the notion of 'quantum-device design' includes the material properties, geometric arrangement (e.g., CAD), and tuning parameters for the idle material configuration.

For some important physical-qubit configurations, the measurement that collapses the quantum state—thereby revealing a quantum-computational result—is a quantum-capacitance measurement. Accordingly, the fabrication, screening, and tuning of such qubits may be guided by the theoretical quantum-capacitance response of the underlying material configuration. Like other quantum-mechanical properties, the theoretical quantum-capacitance response of an unfamiliar material configuration can be very expensive to simulate. In view of the foregoing issues, this disclosure sets forth a new strategy for simulating the quantum-capacitance response of a wide range of material configurations of interest in quantum computing.

1. Quantum-Computer Architecture

Figure 1:
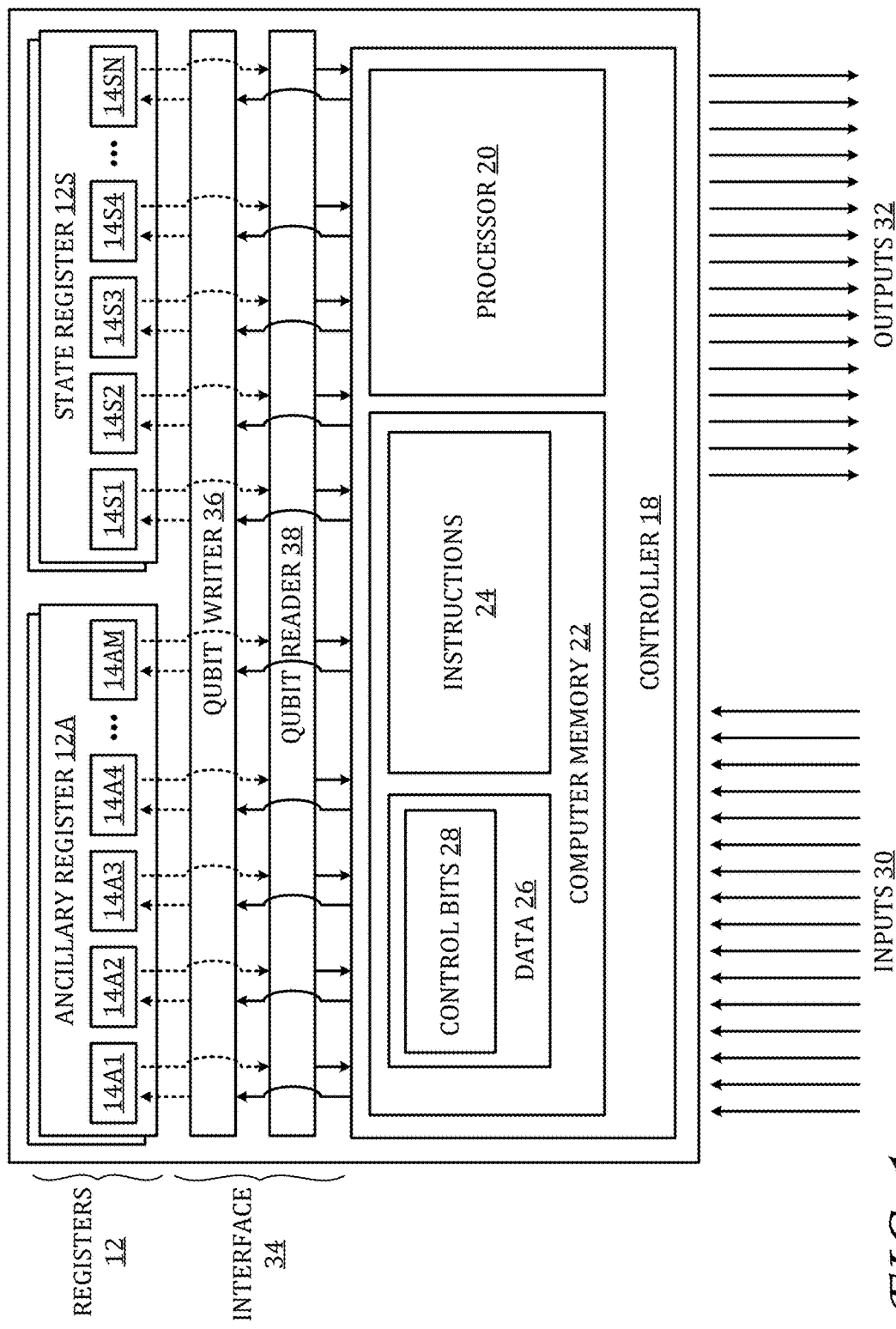
FIG. 1 shows aspects of an example quantum computer.

In order to provide a context for quantum-capacitance simulation, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., state register 12S and auxiliary register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
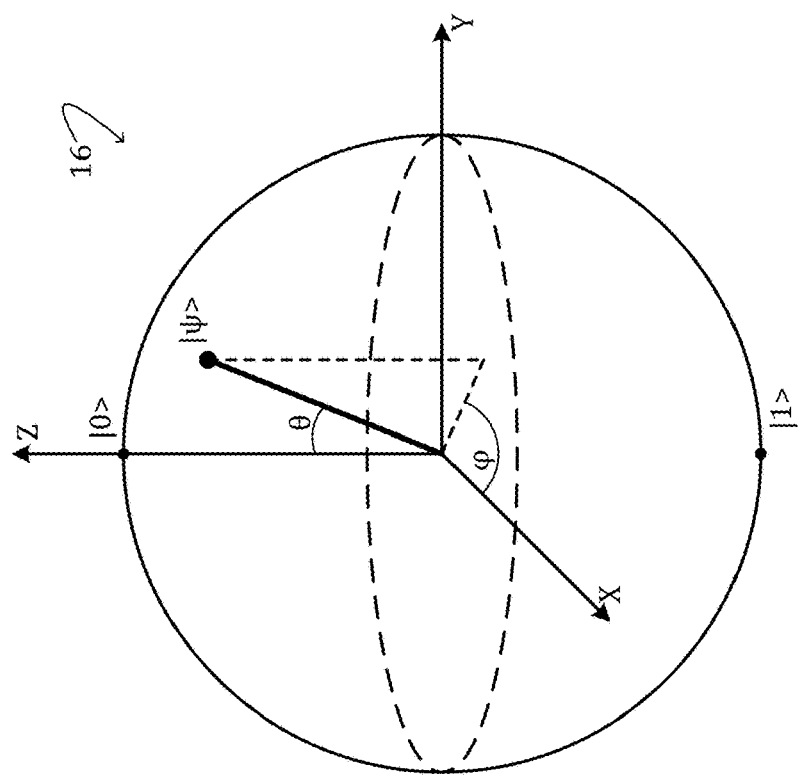
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'control system'.

In some examples, suitably configured signal from qubit writer 36 may interact physically with one or more qubits 14 of a qubit register 12, to trigger measurement of the quantum state held in the one or more qubits. Qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14S of state register 12S of quantum computer 10. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}}\begin{bmatrix} 1 & 1 \\ 1 & -1 \end{bmatrix}. \tag{1}$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix}. \tag{2}$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $|\psi\rangle$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \tag{3}$$

A 'Clifford gate' is a quantum gate that belongs to the Clifford group—viz., a set of quantum gates that effect permutations of the Pauli operators. For the n-qubit case the Pauli operators form a group $$P_n = \left\{ e^{\frac{i\theta\pi}{2}} \sigma_{j_1} \otimes \ldots \otimes \sigma_{j_n} \middle| \theta = 0, 1, 2, 3, j_k = 0, 1, 2, 3 \right\}, \tag{4}$$

where $\sigma_0, \ldots \sigma_3$ are the single-qubit Pauli matrices. The Clifford group is then defined as the group of unitaries that normalize the Pauli group, $$C_n = \{V \in U_{2^n} | VP_n V\dagger = P_n\}. \tag{5}$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
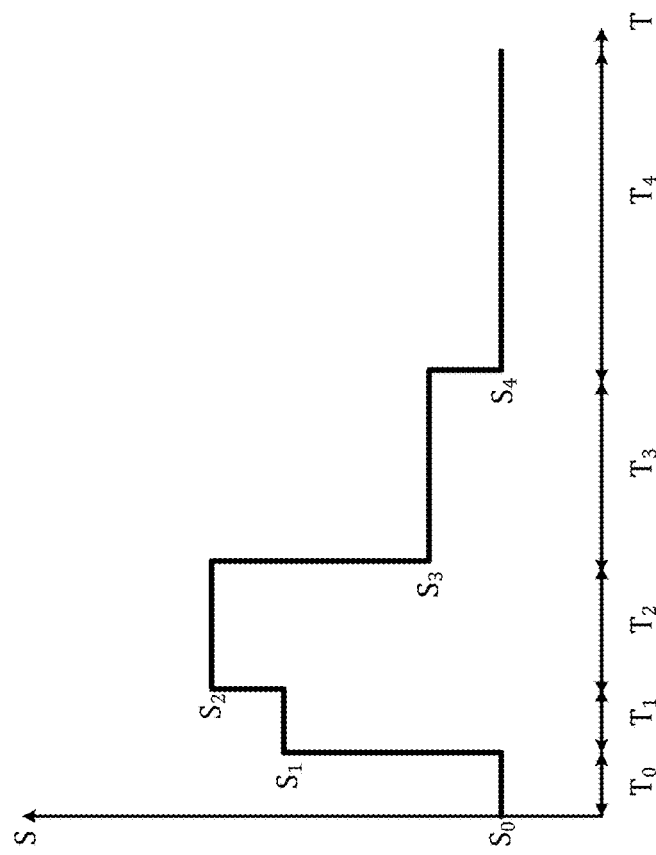
FIG. 3 shows aspects of an example signal waveform for effecting a quantum-gate operation or measurement in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'quantum circuit' and 'quantum algorithm' are used herein to describe a predetermined sequence of elementary quantum-gate and/or measurement operations executable by quantum computer 10. A quantum circuit may be used to transform the quantum state of a qubit register 12 to effect a classical or non-elementary quantum-gate operation or to apply a density operator, for example. In some examples, a quantum circuit may be used to enact a pre-defined operation $f(x)$, which may be incorporated into a complex sequence of operations. To ensure adjoint operation, a quantum circuit mapping n input qubits $|x\rangle$ to m output or auxiliary qubits $|y=f(x)\rangle$ may be defined as a quantum gate $O(|x\rangle\otimes|y\pm\rangle)$ operating on the (n+m) qubits. In this case, O may be configured to pass the n input qubits unchanged but combine the result of the operation $f(x)$ with the auxiliary qubits via an XOR operation, such that $O(|x\rangle\otimes|y\rangle)=|x\rangle\otimes|y\oplus f(x)\rangle$.

Implicit in the description herein is that each qubit 14 of any qubit register 12 may be interrogated via quantum interface 34 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting quantum algorithm or circuit that reveals the quantum state of the logical qubit with above-threshold confidence.

2. Introduction to Quantum-Capacitance Simulation

This disclosure provides an approach for predicting the quantum capacitance of a multi-part quantum device, taking into account realistic device geometries, material parameters, etc. Such a device may comprise complex, hybrid material configuration including semiconductors and/or superconductors. In these and other examples, the quantum capacitance and its dependence on the quantum state of a system is a crucial part of the readout strategy of several leading qubit platforms, including semiconductor quantum dots and spin qubits, as well as scalable measurement-based topological qubit designs [Ref. 1], where quantum capacitance is measured in standard readout techniques such as dispersive gate sensing. Given their relevance to several qubit platforms, tools to simulate these properties are highly sought after and have been pursued by the academic community.

The devices in question can be comprised of several parts, including quantum dots (e.g., semiconducting, metallic or superconducting), topological or trivial superconductors, etc. As such, the device may have many tuning parameters, such as gate voltages, magnetic field, etc. It is typically of interest how the quantum-capacitance signal (i.e., response) depends on extrinsic parameters of the system, such as gate voltage settings, the enclosed flux in the case of an interferometer, etc. In qubit devices, it is of interest to understand how the quantum-capacitance signal depends on the intrinsic state of the qubit.

Figure 4:
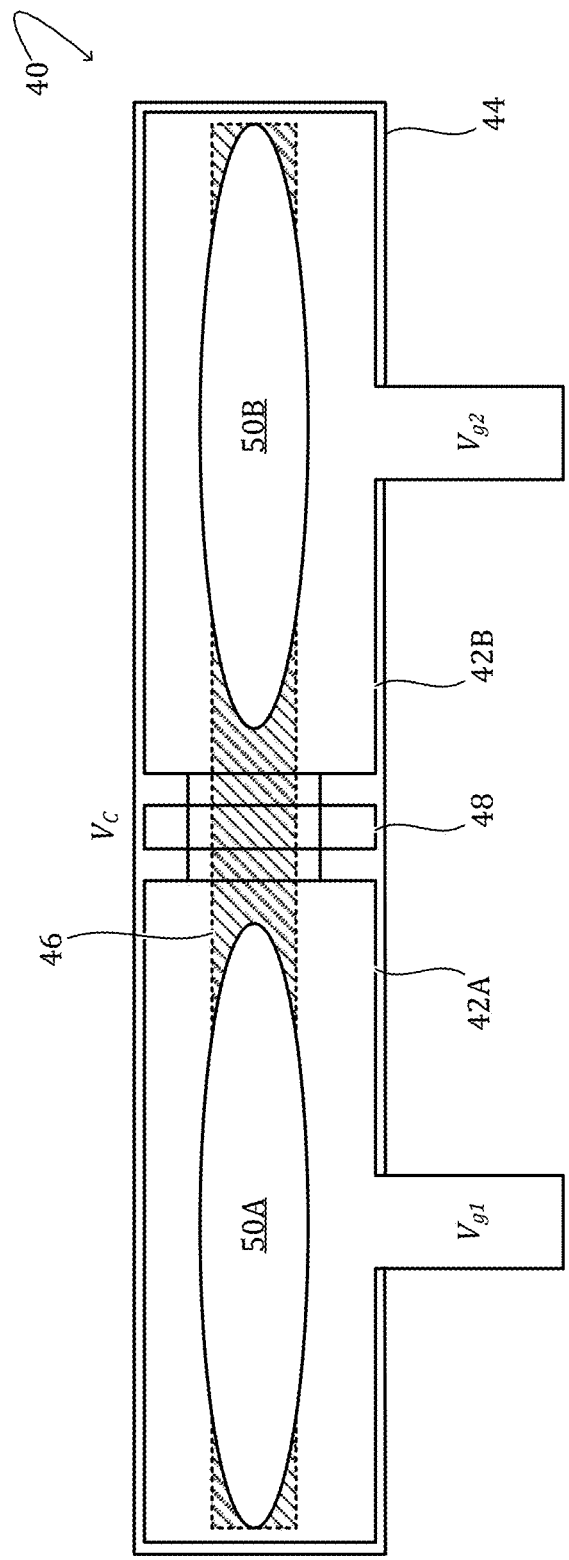
FIG. 4 shows aspects of an example material configuration that can be interrogated via a quantum-capacitance measurement.

FIG. 4 shows aspects of an example material configuration 40 that can be interrogated via a quantum-capacitance measurement. More specifically, FIG. 4 is a schematic top view of an electrostatically defined double-quantum dot device. Metallic depletion gates 42A and 42B are deposited on top of a semiconductor stack 44. The different semiconductors forming the stack (e.g., GaAs or Si/SiGe) create a quantum well—viz., a 2D electron gas—below the surface of the stack. The depletion gates are used to deplete the electron gas, creating a nearly 1D channel 46 of electrons. The central electrode 48 can be biased at a voltage $V_c$ sufficient to separate the electron channel into two quantum dots, 50A and 50B, by depletion of the central region. The gate voltages $V_{g1}$ and $V_{g2}$ control the number of electrons in the quantum dots. The gate voltages are proportional to the dimensionless $N_{g1}$ and $N_{g2}$ parameters introduced hereinafter.

An important aspect of quantum-capacitance simulation is that accurate prediction of the quantum capacitance requires treating electron-electron interactions in the system. However, simulation of an interacting quantum system is exponentially hard in the general case and therefore not feasible on current supercomputers (except for small 'toy problems' or certain highly specific classes of problems). Described below is a workflow that exploits certain features of a mesoscopic device to make quantum-capacitance simulation feasible. Accurate simulation of the quantum capacitance is useful for building, screening, and tuning qubit devices using quantum-capacitance-based readout, for example.

3. Workflow Steps

The high-level steps of the workflow are as follows:

1. Based on a description of the device, such as a CAD file or some other way of describing the device geometry, and details of the material parameters, compute a non-interacting Hamiltonian for the system that represents each part as well as the coupling between different parts, parametrized by the relevant tunable parameters of the system.

2. Use natural orbitals to get an effective non-interacting model for each part of the multi-part qubit device with a lower number of degrees of freedom. A natural-orbital approach is outlined in general terms in [Ref. 2]. This step makes the problem amenable to simulation of the interacting system by reducing, relative to the initial Hamiltonian of step 1, the number of degrees of freedom to be treated for the interacting system. The procedure described in [Ref. 2] outlines how, starting from a very large Hamiltonian in step 1, to identify the minimal natural-orbitals basis to properly describe the device in a given energy window. Projection from the initial Hamiltonian basis to the natural-orbitals basis reduces the number of degrees of freedom.

3. Use a sums-of-Gaussians procedure at representative points of the parameter space to assemble a basis of Gaussian states from which low-energy eigenstates can be approximated, with explicit treatment of charging energies based on electrostatics. For this purpose the general methodology of [Ref. 3] may be adapted.

4. Combine Gaussian-state bases from nearby representative points to form an extended basis that is able to span the low-energy states for a vicinity of points, and compute the quantum capacitance within this space. This is the 'Gaussian-subspace aggregation' step. It enables facile computation of numerical derivatives with respect to device parameters, for estimation of the quantum capacitance with high accuracy and limited computational resources, and extraction of high-dimensional parameter scans (such as charge stability diagrams of multi-dot systems) on a fine mesh.

The steps above can also be used separately. For example, one could use an effective model based on other procedures (e.g., a simple, single-band Rashba model with effective parameters) as input to step 3, followed by a sums-of-Gaussians solver and Gaussian-subspace aggregation to obtain the quantum capacitance signal.

4. Definition of the Problem

For a gate that couples capacitively to a quantum dot, the quantum capacitance can be defined as the deviation of the capacitance of the gate from its classical value $C_g$ (defined in the absence of the quantum-dot island):

$$C_Q = \frac{\partial Q_g}{\partial V_g} - C_g = \frac{C_g^2}{C_\Sigma} \frac{\partial \langle \hat{N} \rangle}{\partial N_g} \tag{6}$$

where $Q_g$ is the electron charge on the island, $C_g$ is the (geometric) capacitance of the gate to the quantum dot, $C_\Sigma$ is the total geometric capacitance, $V_g$ is the voltage applied to the gate, $N_g = C_g V_g/e$ is the dimensionless gate voltage, and $\langle \hat{N} \rangle$ is the expectation value of the number of electrons on the dot.

In many relevant cases, the system in question can be described by a Hamiltonian of the form $$\mathcal{H} = \mathcal{H}_f + E_C(\hat{N} - N_g)^2 + \ldots, \tag{7}$$

where $\mathcal{H}_f$ is the non-interacting part of the Hamiltonian, and $E_C = e^2/2C_\Sigma$ is the charging energy.

Determining the capacitances $C_g$ and $C_\Sigma$ can be done using well-established methods, leaving the key problem of computing the expectation value $\langle \hat{N} \rangle$ and its derivatives in low-energy states of the Hamiltonian $\mathcal{H}$.

4. Natural Orbitals

In light of the methods outlined in [Ref. 2], a microscopic description of the quantum device is obtained, which is comprised of several parts p=1, ..., P. Considered herein is a system of fermions with corresponding creation and annihilation operators $c_i^\dagger$, $c_i$; grouping the fermion modes in some part p together, the vector of fermion creation operators is defined for that part, $c_p^\dagger$. The symbol c denotes the vector of all fermionic modes. The fermionic degrees of freedom are, at the mean-field level, described by a Hamiltonian of the form $$\mathcal{H}_f = c^\dagger H c = \sum_p c_p^\dagger H^{(p)} c_p + \sum_{p_1, p_2} [c_{p_1}^\dagger H^{(p_1, p_2)} c_{p_2} + h.c.]. \quad (8)$$

Here, $H^{(p)}$ describes the coupling between fermionic modes within the part p and $H^{(p_1,p_2)}$ describes the tunneling of fermions between parts $p_1$ and $p_2$.

The natural orbitals approximation, as well as further approximations such as mode-space approximation for extended parts, can be expressed as block-diagonal transformations of $H^{(p)}$, i.e., transformations of the form $$Q = \begin{pmatrix} Q_1 & 0 & 0 & \\ 0 & Q_2 & 0 & \\ 0 & 0 & Q_3 & \\ & & & \ddots \end{pmatrix}. \quad (9)$$

where $Q_p$ is a rectangular isometry matrix projecting the Hamiltonian from the initial basis describing part p to a basis of natural orbitals with reduced dimensionality. This can be used to obtain an effective Hamiltonian $\tilde{H} = QHQ^\dagger$, which serves as input to the next simulation steps.

5. Sums-of-Gaussians Method

Introduced next are the charging energy terms for all floating (i.e., not strongly coupled to the ground plane) parts of the device, $$\mathcal{H}_c^{(p)} = E_c^{(p)} (d_p^\dagger \cdot d_p - \tilde{N}_g^{(p)})^2, \quad (10)$$

Where the operators $d_p$ are related to the original fermion operators $c_p$ in the same part through the linear natural orbitals transformation Q, and the charging energy $E_c^{(p)} = e^2/2C_\Sigma^{(p)}$ of part p can be computed from the electrostatics simulations. As discussed in [Ref. 2], this transformation induces an arbitrary offset in the dimensionless gate voltage $\tilde{N}_g$; however, as evident from the definition of the quantum capacitance, such an overall shift is inessential to the desired computation.

The parameter space of the model may involve tuning parameters such as the dimensionless gate voltages on each part, additional control voltages applied to depletion, cutter and other control gates, in- and out-of-plane magnetic field, etc. For a given set of such parameters, a generalization of the approach described in [Ref. 3] is used—viz., the sums-of-Gaussians method—to obtain an approximation to the ground- and low-energy states of the form $$|\psi_m\rangle = \sum_{n=1}^R \lambda_{m,n} |\phi_n\rangle, \quad (11)$$

where $|\phi_n\rangle$ are Gaussian states—i.e., states whose correlations are completely characterized through their two-point function—and where m is an eigenstate index and R is the rank of the sums-of-Gaussians approximation.

The sums-of-Gaussians approach as represented in [Ref. 3] is limited effectively to the ground state. It can be extended, however, to low-energy excited states for calculation of finite-temperature device properties. In its standard form, the method can be described as a repeated application of a two step procedure: i) perturb each Gaussian state following the approximate evolution equation described in [Ref. 3], and ii) calculate the complex amplitudes $\{\lambda_{1,n}\}$, which are the coefficients of the lowest-energy eigenvector of the Hamiltonian projected on the Gaussian subspace h. More formally, as the Gaussian states are nonorthogonal, the amplitudes are the lowest-energy eigenvector of the generalized eigenvalue problem $h\lambda = \varepsilon G\lambda$, where $h_{n,m} = \langle \phi_n | \mathcal{H} | \phi_m \rangle$ is the projected Hamiltonian, $G_{n,m} = \langle \phi_n | \phi_m \rangle$ is the overlap matrix and $\varepsilon$ is the ground-state energy. Once converged to a low-energy state, this procedure is repeated for an increasingly larger number of Gaussian states until the desired precision is reached. Hereinafter $R_1$ denotes the final number of Gaussian states, following this procedure, used to properly describe the ground state. To calculate low-energy excited states, the sums-of-Gaussians method is extended as follows: i) for a Gaussian subspace of dimension $R_2 > R_1$ keeping the first $R_1$ Gaussian states fixed, perturb the additional states following the same procedure as for the ground-state; ii) calculate the complex amplitudes $\{\lambda_{2,n}\}$ now corresponding to the second eigenstate of h. Once the first-excited state as been calculated to desired precision, the extension of the method can be repeated, now targeting the second excited state and so on until all desired eigenstates are well approximated within the Gaussian subspace.

7. Gaussian Subspace Aggregation

The sums-of-Gaussians method reveals the low-energy eigenstates and enables calculation of the observable at individual points in the parameter space. However, in most cases one is interested in sweeping a large set of parameters as part of a simulation, ideally in a near-continuous fashion. One example is the computation of the quantum capacitance $C_q$ of eq 6: the most practical way of computing the derivative is via finite differences, where $\langle \hat{N} \rangle$ is computed on a very fine grid of $N_g$ points. One also may study the dependence of $C_q$ on parameters such as $N_g$, the magnetic field, etc., on a fine grid.

To solve this problem, the method of Gaussian subspace aggregation is applied. This method uses the sums-of-Gaussians solutions at a discrete sets of 'representative' points in the parameter space to efficiently and accurately approximate the local low-energy eigenstates, and thus evaluate physical observables, at in-between points within the sampled parameter-space region.

Selected first is a discrete set of representative parameter points labeled $j \in 1 \ldots J$ that span the relevant parameter space. It is important to choose a set that is sufficiently dense to capture all the relevant physics; for example, for a charge stability diagram, one should have several points for each charge state. Next the interacting Hamiltonian $H_j$ is constructed, and the sums-of-Gaussians method is used to solve the interacting problem for each set of parameters. The output of each of these independent calculations includes a set of nonorthogonal Gaussian states $$\mathcal{A}_j = \{\phi_n(j)\}, n \in 1 \ldots R_j\}, \quad (12)$$

whose span includes approximations of the low-energy eigenstates of $H_j$. By aggregating these Gaussian subspaces from solutions at a set of parameter points S in some neighborhood in parameter space, a larger Gaussian subspace, $$_r\mathcal{A}(S) = \bigoplus_{j \in S} {}_r\mathcal{A}_j = \{|\phi_{n_j}(j)\rangle | j \in S, n_j \in 1 \ldots R_j\} \quad (13)$$

with dimension $R_S = \Sigma_{j \in S} R_j$, is constructed. The projection of the Hamiltonian at parameters in the vicinity of S on the aggregated subspace $\mathcal{A}(S)$ can then be solved efficiently to obtain the approximate low-energy eigenstates of the problem.

The aggregated Gaussian subspace method is particularly efficient as the aggregated subspace needs to be computed only once—at a computation cost $O(R_S^2 N^3)$ where N is the number of fermionic degrees of freedom in the natural orbitals model—after which the computational cost of solving the problem in the vicinity of S is dominated by solving a generalized eigenvalue problem which is at worst an $O(R_S^3)$ computational cost.

Figure 5:
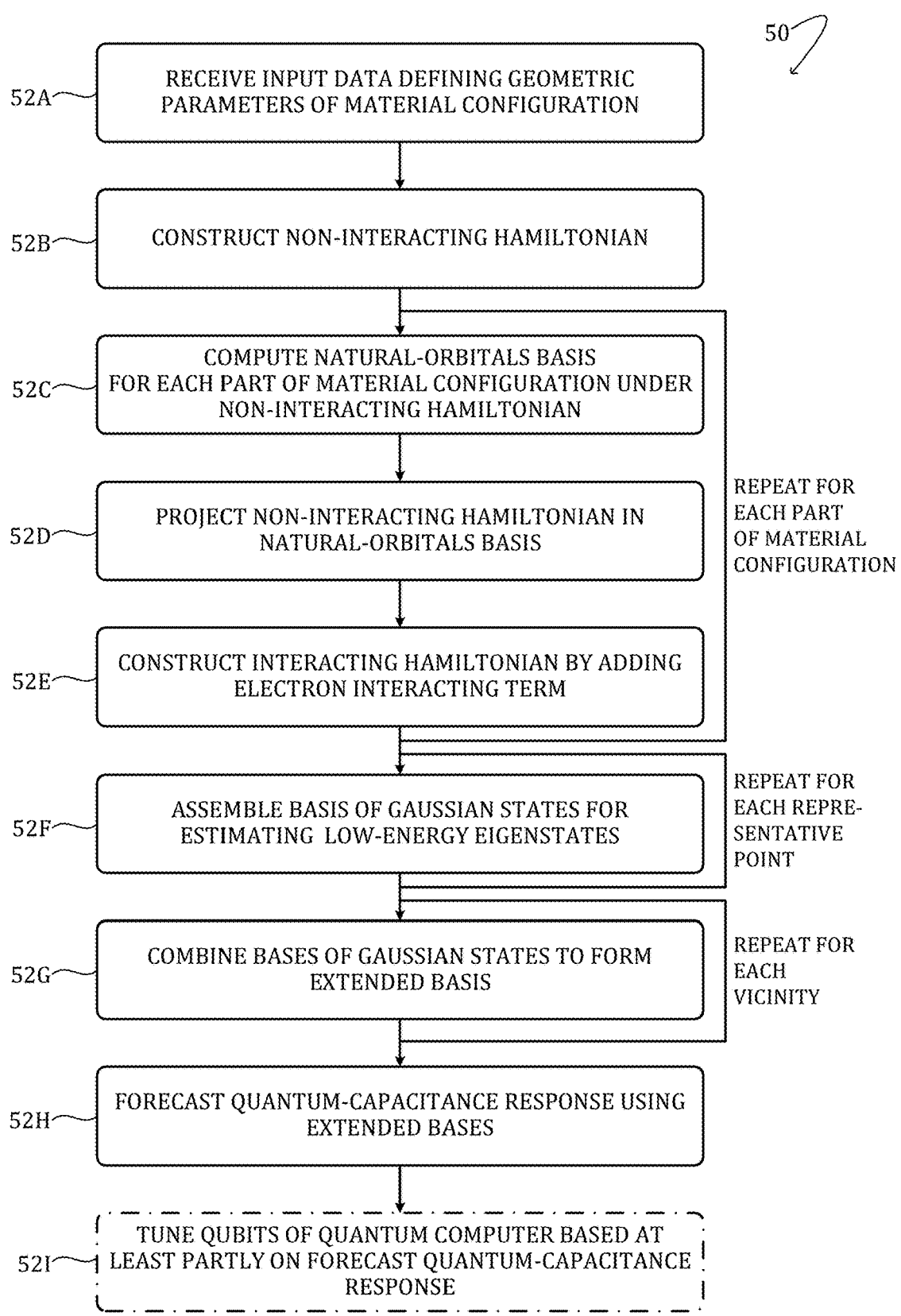
FIG. 5 shows aspects of an example method for simulating a quantum-capacitance response of a material configuration.

In light of the description above, FIG. 5 shows aspects of an example method 50 for simulating a quantum-capacitance response of a material configuration. In some examples the material configuration comprises a quantum device and, in more particular examples, a physical qubit or part of a physical qubit. For instance, and without tying method 50 to any particular structure, the material configuration may comprise an electrostatically defined double-quantum-dot device, as shown in FIG. 4. In some examples the material configuration may comprise a topological qubit or plurality of topological qubits.

At 52A of method 50, input data is received which defines one or more geometric parameters of the material configuration. The input data may comprise a computer-assisted drafting (CAD) file, for instance, or related data. In some examples the input data further defines one or more material parameters of the material configuration—chemical composition, lattice structure, electronegativity, hardness, etc.

At 52B a non-interacting Hamiltonian for the material configuration is constructed based on the input data. In some examples the non-interacting Hamiltonian describes (i) each of a plurality of parts of the material configuration and (ii) a coupling between each pair of the parts. Example parts may include metal-film gates, a semiconductor stack, etc. In some examples the non-interacting Hamiltonian is parameterized according to at least one tunable parameter of the material configuration—e.g., for operating as a qubit of a quantum computer. For instance, the at least one tunable parameter may include a gate voltage applied to the material configuration. In this and other examples the at least one tunable parameter may include an external in- and/or out-of-plane magnetic field strength.

At 52C a natural-orbitals basis is computed for each of a plurality of parts of the material configuration under the non-interacting Hamiltonian. Generally speaking, the natural orbitals are eigenstates of the single-particle reduced density matrix describing a part of the system, which, in turn, is computed using the non-interacting Hamiltonian. Typically the natural-orbitals basis has reduced dimensionality relative to the initial basis—i.e., the non-interacting Hamiltonian of the initial problem is generally constructed using finite elements or finite difference, and is thus defined on a very fine grid/mesh describing the whole device.

At 52D the non-interacting Hamiltonian is projected in the natural-orbitals bases, as computed above, to obtain a non-interacting quantum-mechanical description for each of the plurality of parts. Typically the non-interacting quantum-mechanical description has fewer degrees of freedom than the initial model. At 52E an interacting Hamiltonian is constructed by adding an electron-interaction term to the non-interacting Hamiltonian for each of the plurality of parts—e.g., eq 10. In this manner, the effect of charging energy is represented in the interacting Hamiltonian. Charging energy terms may be based on any suitable electrostatics model.

Considered in method 50 is a sample space of at least one tunable parameter of the material configuration. Typically the Hamiltonians above are functions of the at least one tunable parameter. A sample space of two arbitrary parameters, $P_1$ and $P_2$, is shown by example in FIG. 6. The illustrated sample space includes a plurality of representative points 64, which are points on a relatively coarse-grid that represents the characteristic features of the sample space. In FIG. 5, for each of a plurality of representative points in the sample space, a sums-of-Gaussians computation is used at 52F to assemble a basis of Gaussian states for approximating, at that representative point, the low-energy, many-body eigenstates of the material configuration under the interacting Hamiltonian. As noted hereinabove, the interacting Hamiltonian includes charging energies. In some examples the sums-of Gaussians computation may follow the approach set forth in Section 5.

Figure 6:
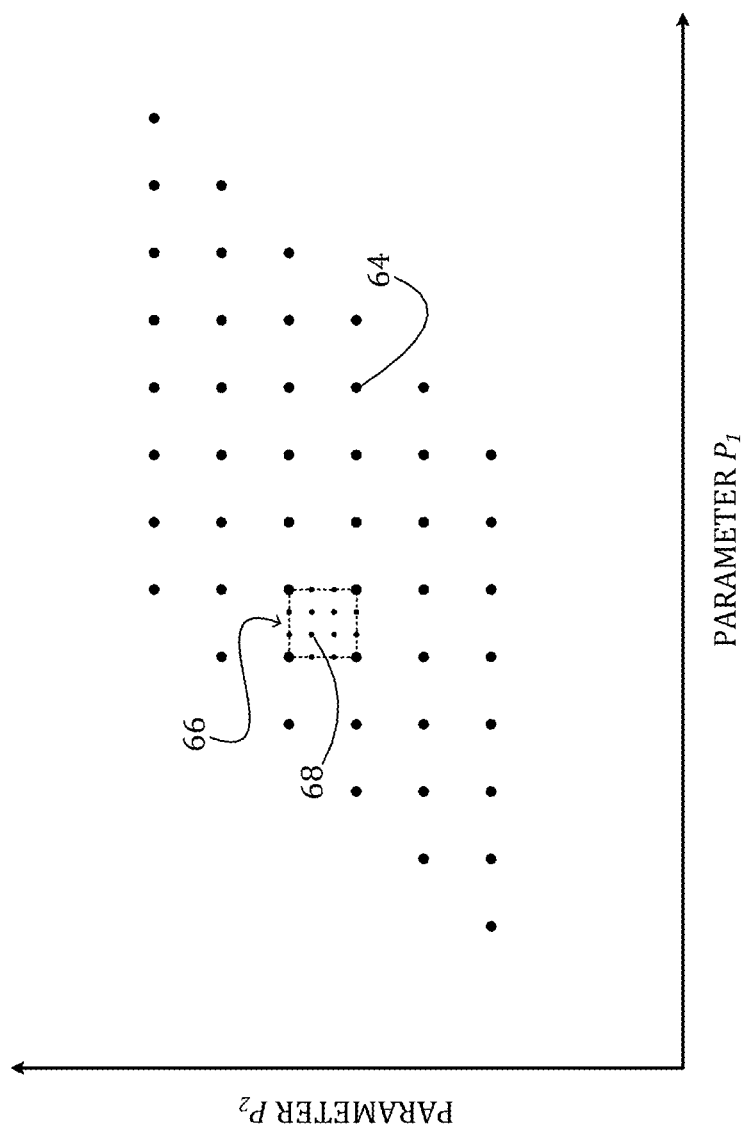
FIG. 6 shows aspects of an example sample space in connection to the method of FIG. 5.

Any group of adjacent representative points in a sample space—e.g., group 66 in FIG. 6—defines a 'vicinity' of intermediate points—e.g., vicinity 68. Taken together, the vicinities of intermediate points define a finer grid than the coarse grid of representative points. In some examples, the intermediate points of the combined vicinities may define a fine enough grid to facilitate gradient estimation via finite-difference approximation. At 52G of method 50, accordingly, for each vicinity of the plurality of the representative points, the bases of Gaussian states assembled for nearby representative points are combined to form an extended basis. The combination is enacted such that the extended basis is a suitable basis for the low-energy states of the material configuration at points of the sample space within that vicinity.

At 52H the quantum-capacitance response of the material configuration is forecast (i.e., computed) within the sample space of the at least one tunable parameter, using the extended basis. In some examples forecasting the quantum-capacitance response includes projecting the interacting Hamiltonian onto the extended Gaussian basis associated with each vicinity of the sample space. In some examples forecasting the quantum-capacitance response includes computing at a finite temperature.

At optional step 52I one or more qubits of a quantum computer are tuned based at least partly on the quantum-capacitance response as computed. The tuning may comprise adjusting the at least one tunable parameter herein for quiescent operation and/or implementation of a quantum gate or measurement. Such parameters may include gate voltages and/or external magnetic-field components, for instance. More generally, the material configuration itself—geometry and material configuration of the various parts, etc.—may be guided by the results of the simulations herein.

Figure 7:
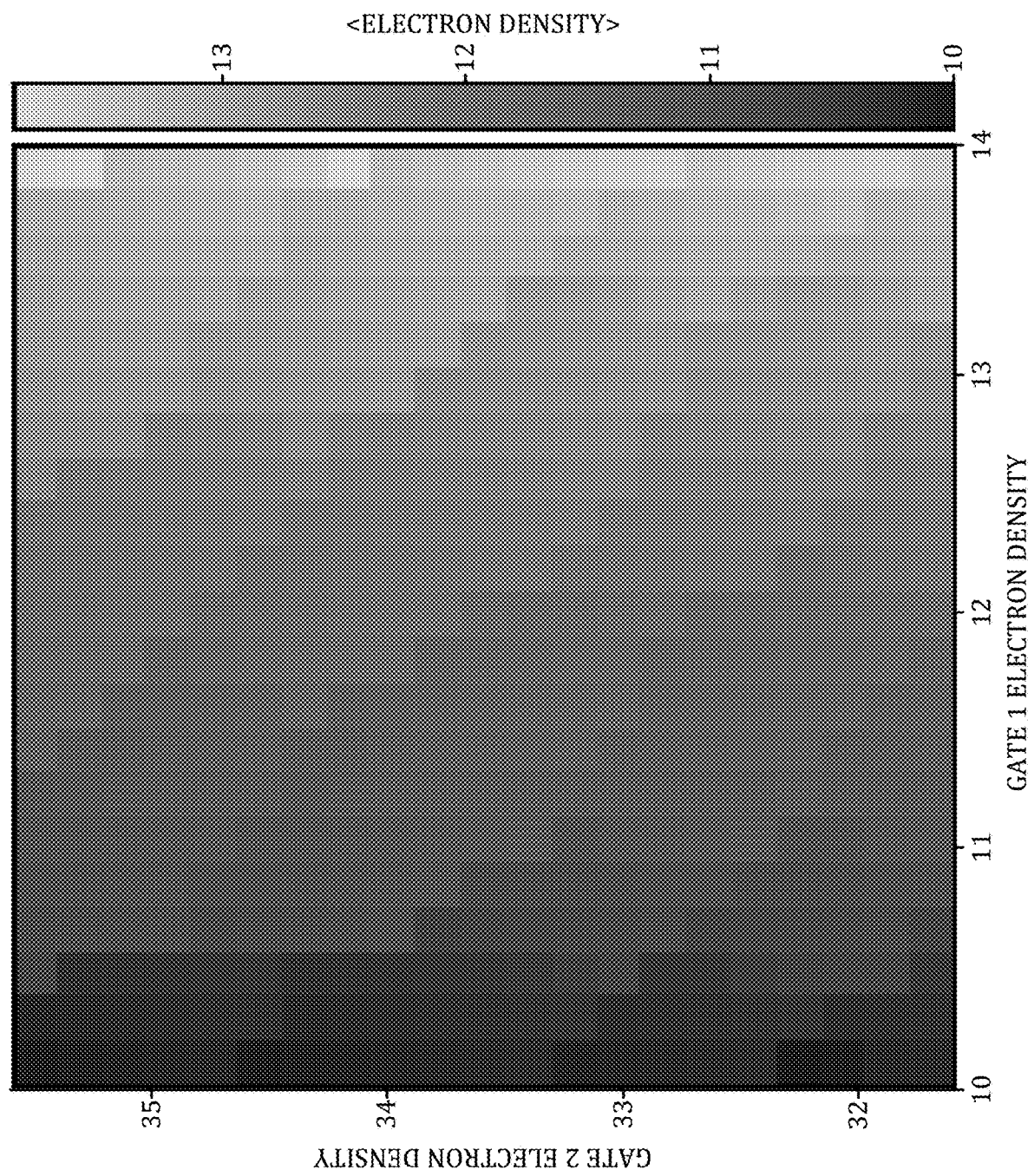
FIG. 7 shows ground-state occupation of a quantum dot on a square grid sampling a 21×21 point parameter space.
Figure 8:
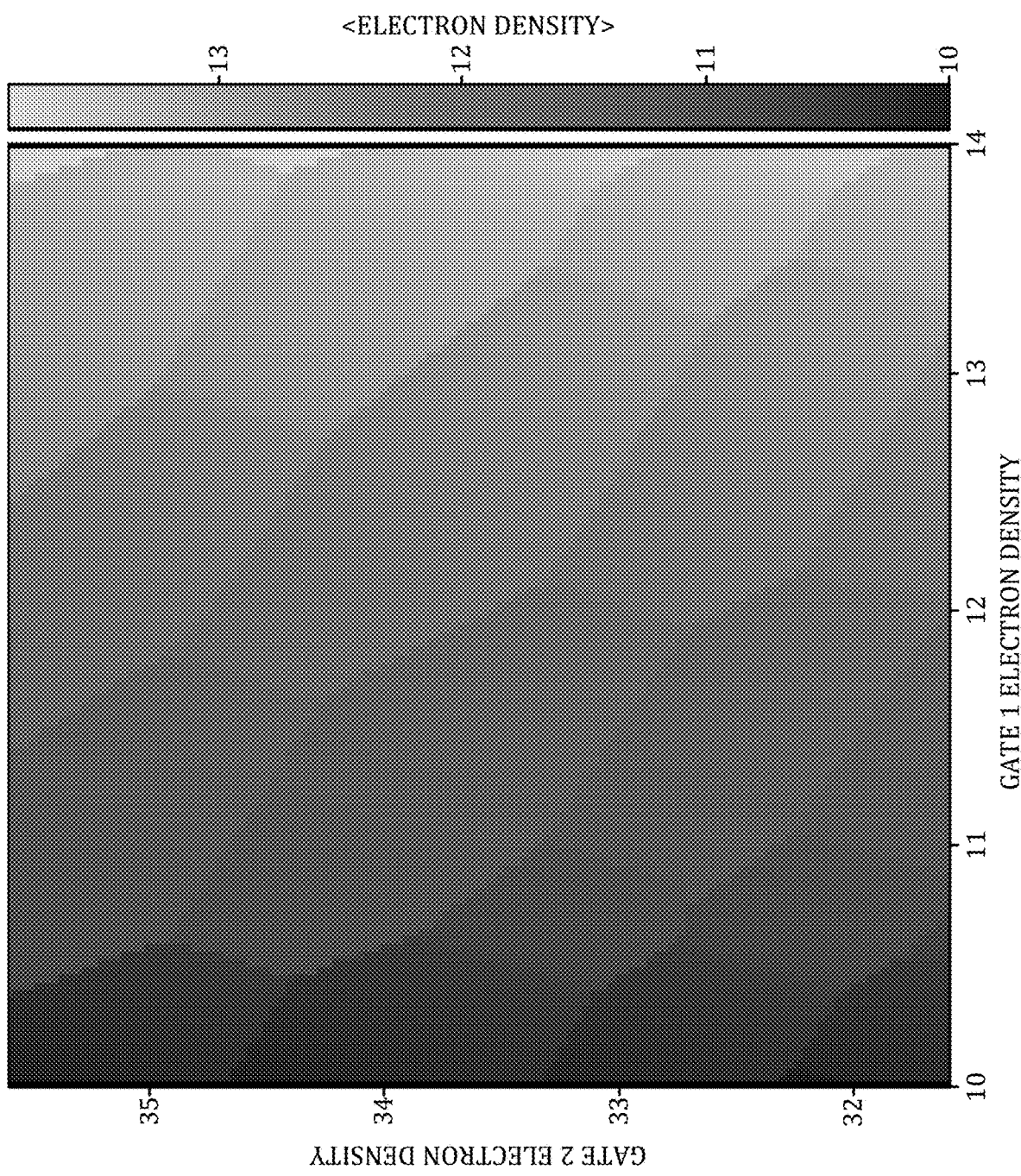
FIG. 8 shows ground-state occupation of a quantum dot on a square grid sampling a 121×121 point parameter space using Gaussian-subspace aggregation.
Figure 9:
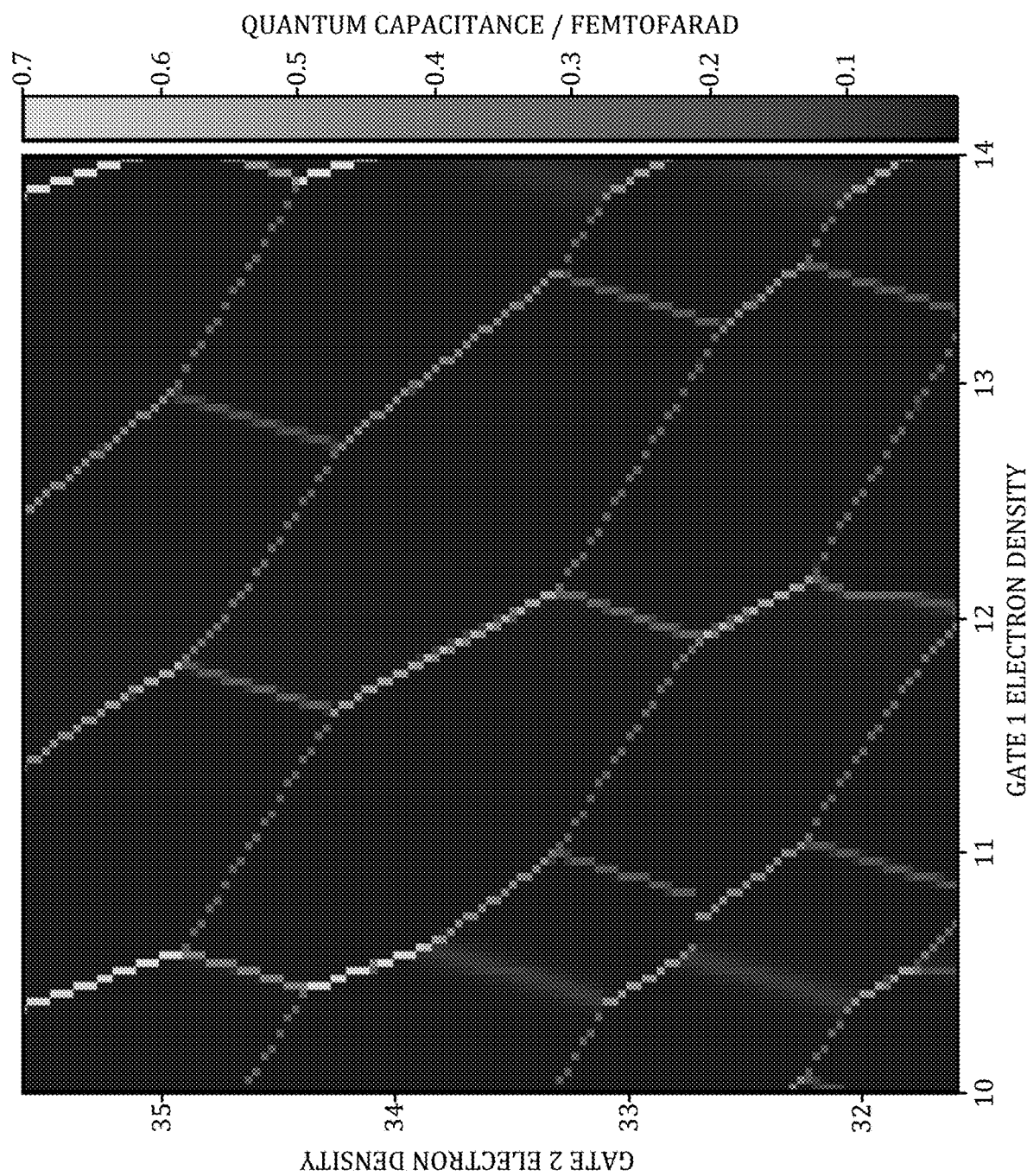
FIG. 9 shows the corresponding quantum capacitance $C_q^{(1)} \propto \partial \langle \hat{N}_1 \rangle / \partial \tilde{N}_g^{(1)}$, forecast using the finer grid of FIG. 8.

FIGS. 7 through 9 show an example result of the application of method 50. More particularly, the plots show aspects of an example application of the Gaussian-subspace aggregation method herein for a double quantum-dot system, as illustrated in FIG. 4.

FIG. 7 shows ground-state occupation of quantum dot 1 $\langle \hat{N}_1 \rangle$ on a square grid sampling the $(\tilde{N}_g^{(1)}, \tilde{N}_g^{(2)})$ parameter space (21×21 points). This requires $21^2=441$ independent sums-of-Gaussians (SGS) simulations. FIG. 8 shows a result using the Gaussian-subspace aggregation method to obtain $\langle \hat{N}_1 \rangle$ on a fine grid (121×121 points). At each point, a 3×3 grid of neighboring, independent SGS solutions is used to construct the aggregated Gaussian subspace. FIG. 9 shows the corresponding quantum capacitance $C_q^{(1)} \propto \partial \langle \hat{N}_1 \rangle / \partial \tilde{N}_g^{(1)}$, obtained using the fine grid of FIG. 8.

Returning briefly to FIG. 1, qubit registers 12 of quantum computer 10 include a plurality of physical qubits 14. Any, some, or all of the physical qubits may include a material configuration as described herein. In some examples fabrication of the material configuration, including material selection, geometry, and optimization thereof, is informed pursuant to enacting the method of FIG. 5 or any suitable variant. Quantum computer 10 includes an interface 34 configured to measure a quantum capacitance of the material configuration, to thereby reveal a quantum state held in a qubit register 12. In some examples the quantum capacitance is measured by subjecting the material configuration to external stimuli. In more particular examples, such external stimuli are determined quantitatively pursuant to enacting the method of FIG. 5 or any suitable variant.

No aspect of the foregoing drawings or description should be understood in a limiting sense, because numerous extensions, variations, and omissions are also envisaged. For instance, although the double quantum-dot example of FIGS. 7 through 9 demonstrates the ability of the simulation method to transition from a coarse sample-space grid to a much finer grid, the methods herein are equally applicable to different samplings of the parameter space (e.g., using a nonuniform sampling scheme based on a learning algorithm). Although the method of FIG. 5 indicates that the non-interacting Hamiltonian may be parameterized according to at least one tunable parameter of the material configuration, that feature neither requires nor excludes additional dependence on the same or different parameters appearing in the interaction terms of the Hamiltonian. Indeed, some tuning parameters, such as the dimensionless gate charge, may only appear in the interaction part of the Hamiltonian.

8. Additional Information and Classical Computer-System Description

Additional information can be found in the following references, which are hereby incorporated by reference herein for all purposes:

[Ref. 1] Torsten Karzig, Christina Knapp, Roman M Lutchyn, Parsa Bonderson, Matthew B Hastings, Chetan Nayak, Jason Alicea, Karsten Flensberg, Stephan Plugge, Yuval Oreg, et al., "Scalable designs for quasiparticle-poisoning-protected topological quantum computation with Majorana zero modes," *Physical Review B* 95, 235305 (2017).

[Ref. 2] Bela Bauer, Samuel Boutin, Andrey Antipov, and William Cole, "Quantum device simulation using natural-orbital basis," U.S. Patent application submitted. (2021).

[Ref. 3] Samuel Boutin and Bela Bauer, "Quantum impurity models using superpositions of fermionic gaussian states: Practical methods and applications," *Physical Review Research* 3, 033188 (2021).

The methods herein may be tied to a computer system of one or more computing devices. Such methods and processes may be implemented as an application program or service, an application programming interface (API), a library, and/or other computer-program product.

Figure 10:
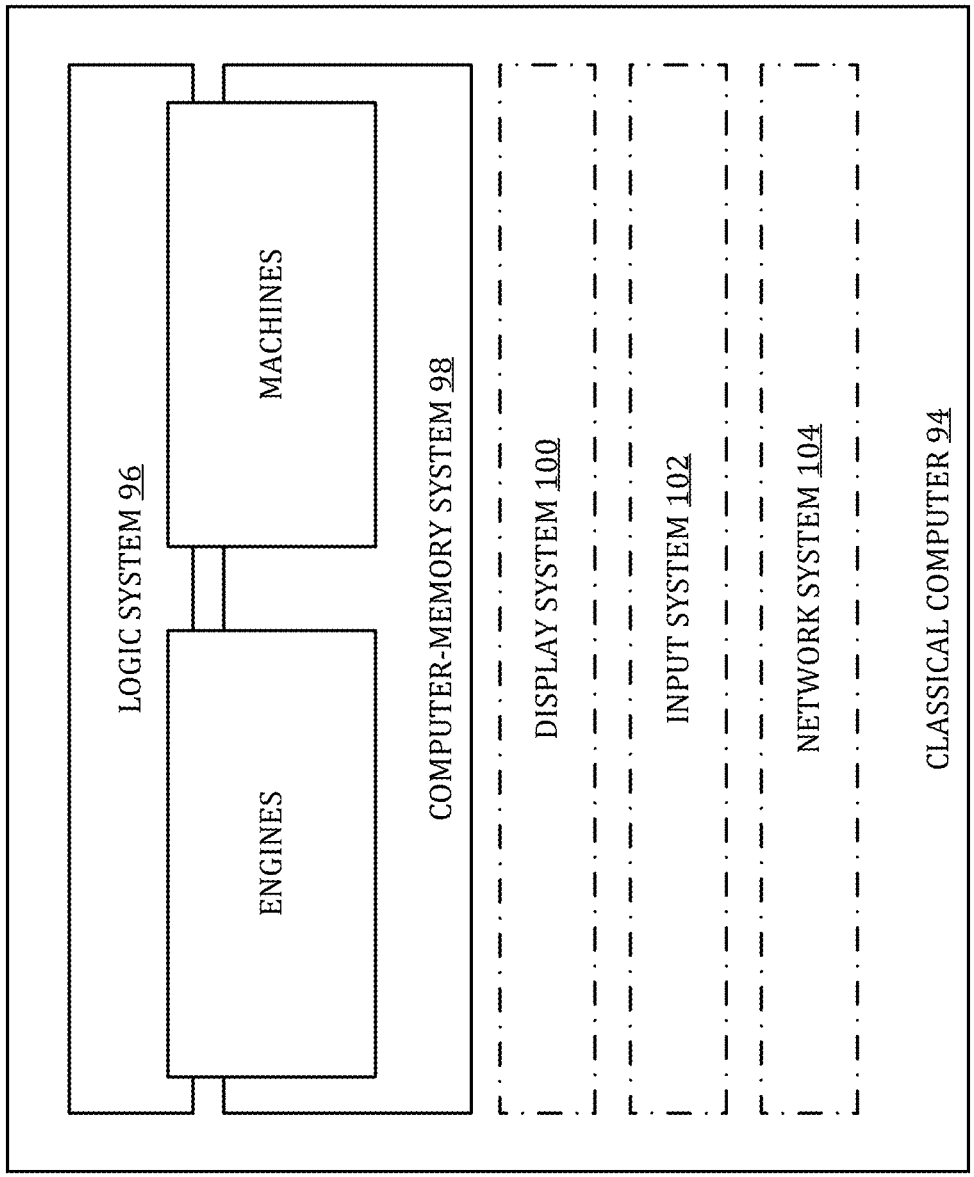
FIG. 10 shows aspects of an example classical computer system.

FIG. 10 provides a schematic representation of a classical computer 94 configured to provide some or all of the classical computer system functionality disclosed herein. Classical computer 94 may take the form of a personal computer, application-server computer, or any other computing device.

Classical computer 94 includes a logic system 96 and a computer-memory system 98. Classical computer 94 may optionally include a display system 100, an input system 102, a network system 104, and/or other systems not shown in the drawings.

Logic system 96 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 98 includes at least one physical device configured to temporarily and/or permanently hold computer system information, such as data and instructions executable by logic system 96. When the computer-memory system includes two or more devices, the devices may be collocated or remotely located. Computer-memory system 98 may include at least one volatile, nonvolatile, dynamic, static, read/write, read-only, random-access, sequential-access, location-addressable, file-addressable, and/or content-addressable computer-memory device. Computer-memory system 98 may include at least one removable and/or built-in computer-memory device. When the logic system executes instructions, the state of computer-memory system 98 may be transformed—e.g., to hold different data.

Aspects of logic system 96 and computer-memory system 98 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 96 and computer-memory system 98 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 100 may be used to present a visual representation of data held by computer-memory system 98. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 102 may comprise or interface with one or more input devices. An input device may include a sensor device or a user input device. Examples of user input devices include a keyboard, mouse, or touch screen.

When included, network system 104 may be configured to communicatively couple classical computer 94 with one or more other computer systems. The network system may include wired and/or wireless communication devices compatible with one or more different communication protocols. The network system may be configured for communication via personal-, local- and/or wide-area networks In conclusion, one aspect of this disclosure is directed to a method for simulating a quantum-capacitance response of a material configuration. The method comprises: (a) constructing a non-interacting Hamiltonian for the material configuration based on input data; (b) computing a natural-orbitals basis for each of a plurality of parts of the material configuration under the non-interacting Hamiltonian; (c) projecting the non-interacting Hamiltonian in the natural-orbitals basis to obtain a non-interacting quantum-mechanical description for each of the plurality of parts; (d) constructing an interacting Hamiltonian by adding an electron-interaction term to the non-interacting Hamiltonian for each of the plurality of parts; (e) for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian; (f) in each of a plurality of vicinities of points in the sample space of the at least one tunable parameter, combining bases of Gaussian states assembled for nearby representative points to form an extended basis; and (g) forecasting the quantum-capacitance response within the sample space of the at least one tunable parameter using the extended basis. The natural-orbitals basis offers the technical benefit of increased computational efficiency by allowing selection of a subset of degrees of freedom relevant to the physical problem within an energy window of interest. The sums-of-Gaussians procedure offers the technical benefit of enabling explicit treatment of charging energies based on electrostatics. The Gaussian-subspace aggregation aspect offers the technical benefit of enabling facile computation of numerical derivatives with respect to device parameters. In combination, these technical benefits enable the simulation of quantum-capacitance responses of quantum devices based on complex material configurations under various ranges of external stimuli.

In some implementations the method further comprises receiving input data defining one or more geometric parameters of the material configuration. In some implementations the input data further defines one or more material parameters of the material configuration. In some implementations the non-interacting Hamiltonian describes (i) each of a plurality of parts of the material configuration and (ii) a coupling between each pair of the parts. In some implementations the non-interacting Hamiltonian is parameterized according to the at least one tunable parameter. In some implementations forecasting the quantum-capacitance response includes, for each point in the sample space, projecting the interacting Hamiltonian onto the extended Gaussian basis associated with the corresponding vicinity of the sample space. In some implementations forecasting the quantum-capacitance response includes forecasting the quantum-capacitance response at finite temperature. In some implementations the material configuration comprises a quantum device. In some implementations the material configuration comprises a physical qubit or part of a physical qubit. In some implementations the method further comprises adjusting one or more tuning parameters of a qubit of a quantum computer based on the quantum-capacitance response as forecast. In some implementations the method further comprises optimizing the material configuration based on the quantum-capacitance response as forecast. In some implementations the sample space of the at least one tunable parameter is a nonuniform sample space defined via a learning algorithm.

Another aspect of this disclosure is directed to a quantum computer comprising: a qubit register with a plurality of physical qubits each including a material configuration; and an interface configured to measure a quantum capacitance of the material configuration, to thereby reveal a quantum state held in the qubit register. The quantum-capacitance is measured by subjecting the material configuration to external stimuli determined pursuant to: (a) constructing a non-interacting Hamiltonian for the material configuration based on input data, (b) computing a natural-orbitals basis for each of a plurality of parts of the material configuration under the non-interacting Hamiltonian, (c) projecting the non-interacting Hamiltonian in the natural-orbitals basis to obtain a non-interacting quantum-mechanical description for each of the plurality of parts, (d) constructing an interacting Hamiltonian by adding an electron-interaction term to the non-interacting Hamiltonian for each of the plurality of parts, (e)

for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian, (f) in each of a plurality of vicinities of points in the sample space of the at least one tunable parameter, combining bases of Gaussian states assembled for nearby representative points to form an extended basis, and (g) forecasting the quantum-capacitance response within the sample space of the at least one tunable parameter using the extended basis.

In some implementations the non-interacting Hamiltonian describes (i) each of a plurality of parts of the material configuration and (ii) a coupling between each pair of the parts. In some implementations the material configuration comprises an electrostatically defined double-quantum-dot device and/or a topological qubit. In some implementations the at least one tunable parameter includes a gate voltage applied to the material configuration. In some implementations, the at least one tunable parameter includes an external magnetic field.

Another aspect of this disclosure is directed to a quantum computer comprising: a qubit register with a plurality of physical qubits each including a material configuration; and an interface configured to measure a quantum capacitance of the material configuration, to thereby reveal a quantum state held in the qubit register. Fabrication of the material configuration is optimized pursuant to: (a) constructing a non-interacting Hamiltonian for the material configuration based on input data, (b) computing a natural-orbitals basis for each of a plurality of parts of the material configuration under the non-interacting Hamiltonian, (c) projecting the non-interacting Hamiltonian in the natural-orbitals basis to obtain a non-interacting quantum-mechanical description for each of the plurality of parts, (d) constructing an interacting Hamiltonian by adding an electron-interaction term to the non-interacting Hamiltonian for each of the plurality of parts, (e) for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian, (f) in each of a plurality of vicinities of points in the sample space of the at least one tunable parameter, combining bases of Gaussian states assembled for nearby representative points to form an extended basis, and (g) forecasting the quantum-capacitance response within the sample space of the at least one tunable parameter using the extended basis.

In some implementations the non-interacting Hamiltonian describes (i) each of a plurality of parts of the material configuration comprises a quantum device and (ii) a coupling between each pair of the parts. In some implementations the at least one tunable parameter includes a gate voltage applied to the material configuration. In some implementations the at least one tunable parameter includes an external magnetic field. In some implementations, the quantum capacitance is measured by subjecting the material configuration to external stimuli determined according to said forecasting, the non-interacting Hamiltonian is parameterized according to at least one tunable parameter of the material configuration when operating as a qubit of the quantum computer, and computing the quantum-capacitance response includes, for each point in the sample space, projecting the interacting Hamiltonian onto the extended Gaussian basis associated with the corresponding vicinity of the sample space.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see. The plots shown in the drawings are theoretical unless otherwise noted.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for simulating a quantum-capacitance response of a material configuration, the method comprising:
   constructing a non-interacting Hamiltonian for the material configuration based on input data;
   computing a natural-orbitals basis for each of a plurality of parts of the material configuration under the non-interacting Hamiltonian;
   projecting the non-interacting Hamiltonian in the natural-orbitals basis to obtain a non-interacting quantum-mechanical description for each of the plurality of parts;
   constructing an interacting Hamiltonian by adding an electron-interaction term to the non-interacting Hamiltonian for each of the plurality of parts;
   for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian;
   in each of a plurality of vicinities of points in the sample space of the at least one tunable parameter, combining bases of Gaussian states assembled for nearby representative points to form an extended basis; and
   forecasting the quantum-capacitance response within the sample space of the at least one tunable parameter using the extended basis.

2. The method of claim 1 further comprising receiving input data defining one or more geometric parameters of the material configuration.

3. The method of claim 2 wherein the input data further defines one or more material parameters of the material configuration.

4. The method of claim 1 wherein the non-interacting Hamiltonian describes (i) each of a plurality of parts of the material configuration and (ii) a coupling between each pair of the parts.

5. The method of claim 1 wherein the non-interacting Hamiltonian is parameterized according to the at least one tunable parameter.

6. The method of claim 1 wherein forecasting the quantum-capacitance response includes, for each point in the sample space, projecting the interacting Hamiltonian onto the extended Gaussian basis associated with the corresponding vicinity of the sample space.

7. The method of claim 1 wherein forecasting the quantum-capacitance response includes forecasting the quantum-capacitance response at finite temperature.

8. The method of claim 1 wherein the material configuration comprises a quantum device.

9. The method of claim 1 wherein the material configuration comprises a physical qubit or part of a physical qubit.

10. The method of claim 1 further comprising adjusting one or more tuning parameters of a qubit of a quantum computer based on the quantum-capacitance response as forecast.

11. The method of claim 1 further comprising optimizing the material configuration based on the quantum-capacitance response as forecast.

12. The method of claim 1 wherein the sample space of the at least one tunable parameter is a nonuniform sample space defined via a learning algorithm.

13. A quantum computer comprising:
   a qubit register with a plurality of physical qubits each including a material configuration; and
   an interface configured to measure a quantum capacitance of the material configuration, to thereby reveal a quantum state held in the qubit register, wherein the quantum capacitance is measured by subjecting the material configuration to external stimuli determined pursuant to
      constructing a non-interacting Hamiltonian for the material configuration based on input data,
      computing a natural-orbitals basis for each of a plurality of parts of the material configuration under the non-interacting Hamiltonian,
      projecting the non-interacting Hamiltonian in the natural-orbitals basis to obtain a non-interacting quantum-mechanical description for each of the plurality of parts,
      constructing an interacting Hamiltonian by adding an electron-interaction term to the non-interacting Hamiltonian for each of the plurality of parts,
      for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian,
      in each of a plurality of vicinities of points in the sample space of the at least one tunable parameter, combining bases of Gaussian states assembled for nearby representative points to form an extended basis, and
      forecasting the quantum-capacitance response within the sample space of the at least one tunable parameter using the extended basis.

14. The quantum computer of claim 13 wherein the non-interacting Hamiltonian describes (i) each of a plurality of parts of the material configuration and (ii) a coupling between each pair of the parts.

15. The quantum computer of claim 13 wherein the material configuration comprises an electrostatically defined double-quantum-dot device and/or a topological qubit.

16. The quantum computer of claim 13 wherein the at least one tunable parameter includes a gate voltage applied to the material configuration, and wherein the at least one tunable parameter includes an external magnetic field.

17. A quantum computer comprising:
   a qubit register with a plurality of physical qubits each including a material configuration; and
   an interface configured to measure a quantum capacitance of the material configuration, to thereby reveal a quantum state held in the qubit register, wherein the material configuration is optimized pursuant to
      constructing a non-interacting Hamiltonian for the material configuration based on input data,
      computing a natural-orbitals basis for each of a plurality of parts of the material configuration under the non-interacting Hamiltonian,
      projecting the non-interacting Hamiltonian in the natural-orbitals basis to obtain a non-interacting quantum-mechanical description for each of the plurality of parts,
      constructing an interacting Hamiltonian by adding an electron-interaction term to the non-interacting Hamiltonian for each of the plurality of parts,
      for each of a plurality of representative points in a sample space of at least one tunable parameter of the material configuration, using a sums-of-Gaussians procedure to assemble a basis of Gaussian states for approximating low-energy eigenstates of the material configuration under the interacting Hamiltonian,
      in each of a plurality of vicinities of points in the sample space of the at least one tunable parameter, combining bases of Gaussian states assembled for nearby representative points to form an extended basis, and
      forecasting the quantum-capacitance response within the sample space of the at least one tunable parameter using the extended basis.

18. The quantum computer of claim 17 wherein the non-interacting Hamiltonian describes (i) each of a plurality of parts of the material configuration and (ii) a coupling between each pair of the parts.

19. The quantum computer of claim 17 wherein the at least one tunable parameter includes a gate voltage applied to the material configuration, and wherein the at least one tunable parameter includes an external magnetic field.

20. The quantum computer of claim 17 wherein the quantum capacitance is measured by subjecting the material configuration to external stimuli determined according to said forecasting, wherein the non-interacting Hamiltonian is parameterized according to at least one tunable parameter of the material configuration when operating as a qubit of the quantum computer, and wherein computing the quantum-capacitance response includes, for each point in the sample space, projecting the interacting Hamiltonian onto the extended Gaussian basis associated with the corresponding vicinity of the sample space.

* * * * *